Sept. 4, 1928.
W. M. PRYOR
DRAG CHAIN LINK
Filed April 9, 1927
1,682,983
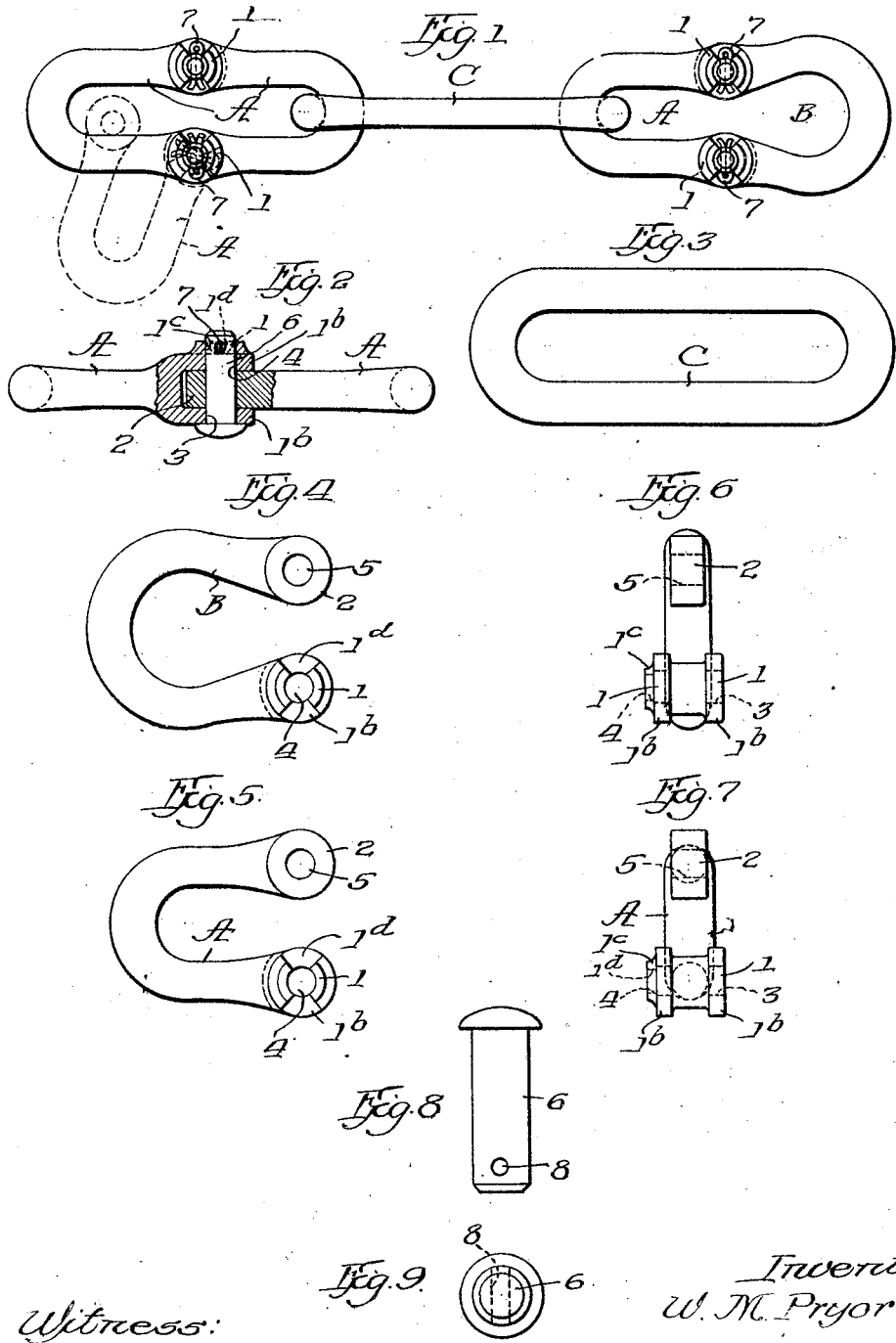
Inventor,
W. M. Pryor
By Wilkinson, Huxley, Byron & Knight
Attys
Witness:

Patented Sept. 4, 1928.

1,682,983

UNITED STATES PATENT OFFICE.

WILLIAM M. PRYOR, OF ST. LOUIS, MISSOURI, ASSIGNOR TO SOUTHERN MANGANESE STEEL COMPANY, OF ST. LOUIS, MISSOURI, A CORPORATION OF DELAWARE.

DRAG-CHAIN LINK.

Application filed April 9, 1927. Serial No. 182,242.

This invention relates to chains, and particularly chains some of the links of which, for instance, each alternate link, are made of parts adapting them to be interengaged with adjacent links, after which the parts are articulated to produce therefrom complete connecting links.

In links of the kind referred to, it has long been proposed to make an articulated link of two substantially U-shaped members, each constituting about one-half the link, and connect their open ends together through means of pins capable of withstanding by shearing resistance the load to be imposed upon the link; the meeting ends of the link members being, respectively, single and bifurcated in order to properly sustain the articulating pins; but such links have generally been articulated upon a single axis extending transversely of the link but parallel to the plane thereof, with the result that the link is flexible upon its axis of articulation and does not constitute a link having the same rigidity as a solid link; moreover, stresses transmitted from one-half the link to the other, in the direction of the minor axis of the link, imposed bending strains upon the bifurcations between the intervening members and the intervening parts.

The object of the present invention is to produce a two-part link which will be rigid at the line of articulation, in all directions, and one in which stresses transmitted between the members of the link in the direction of the minor axis will be taken up by compression upon one articulation and tension upon the other without any tendency to bend the articulated parts, and any stresses developed by spreading or contracting of the minor axis of the link will remain unresisted by the articulating members, so that in the event of a tensional load sufficient to deform the link, the sides of the link can assume, under such tension, any resultant alignment without spreading the bifurcations of or otherwise deforming the articulations.

In the accompanying drawing, in which the preferred embodiment of the invention is shown by way of illustration—

Figure 1 represents a portion of a chain made up of two links each embodying the subject-matter of the present invention, and an intermediate solid link through which they are connected.

Figure 2 is a view of one of the links embodying the invention as seen from a direction at right angles to the picture plane of Figure 1, to-wit, edgewise of the longer dimension of the link.

Figure 3 is a view of the intermediate solid link in a direction at right angles from that in which it appears in Figure 1, namely, a face view thereof.

Figures 4 and 5 are face views of two link members substantially identical in construction but differing slightly in design, and which are adapted to be assembled to form the ink appearing at the right hand end of Figure 1, or either of which can be duplicated to form a complete link, for instance, as suggested at the left-hand end of Figure 1, where the link is made up by duplicating the design of Figure 5.

Figures 6 and 7 are end views, respectively, of the links shown in Figures 4 and 5; and Figures 8 and 9 show, respectively, in side elevation and end view, one of the pins used in articulating the link.

A—A at the left-hand end of Figure 1, and A—B at the right-hand end of Figure 1 represent two articulated links each constructed in accordance with the present invention. C is an intermediate solid link connecting said articulated links. A in Figures 5 and 7 shows one of the two identical members constituting the link A—A of Figures 1 and 2, also one-half of link A—B of Figure 1; and B in Figures 4 and 6 shows the remaining half of the link A—B of Figure 1. Link members A and B are not materially different in structure or principle; they are merely different in the design of their arcuate portions. The link members in order to adapt them for articulation, are provided at diametrically opposite points, with bifurcated ends 1 and single ends 2, of which the latter are adapted to fit snugly between the bifurcations of the former. Each bifurcated end is provided with eyes 3, 4, while the coacting single end 2 is provided with an eye 5, and these eyes are in alignment when the members are assembled so that they may receive the articulating pins 6. Preferably, there is one single end and one bifurcated end on each link member so that two identical members can be assembled to form a complete link. The bifurcated ends 1 have their bifurcations 1ᵇ preferably enlarged to provide a hub-like portion 1ᶜ, constructed with a diametric groove 1ᵈ within which may be received a cotter pin 7 which passes through the bore 8 in the end of the pin 6 for holding the latter against displacement.

An important feature of the present invention resides in the presentation of the eyes 3, 4, and 5 relatively to the plane of the link, namely, with their axes perpendicular to said plane and spaced apart therein so that the members A—A or A—B, or even two members such as B when assembled to form a link, will be rigid against flexure perpendicularly to the plane of the link; any stress transmitted from one-half of the link to the other in the plane of the link will be taken up by shearing resistance of the pins 7; any distortion of the link, for instance, by straining of its sides under tension of the chain, will impose no bending moment upon the joints; whatever stresses are developed will be imposed uniformly upon the two sides by reason of the diametric location of the articulations, and other advantages will accrue, such, for instance, as presentation of the cotter pins all in one direction or on one face of the chain, thus leaving the other face and the sides free for contact with guiding surfaces.

Still another important advantage arising from the use of link members articulated on two axes perpendicular to and spaced apart in the plane of the link, is that in coupling and uncoupling the link from an adjacent link, it is necessary to release only one pin, whereupon the link will be free to open to a sufficient angle to admit the other link or any equivalent looped member such as a clevis, eye-bar, or the like, after which the removed pin can be replaced to complete the connection.

I claim:

1. A composite link, comprising members of substantial U-shape having meeting ends that are, respectively, bifurcated and single, and pins passing through said meeting ends, said pins being positioned with their axes perpendicular to and spaced apart in the plane of the link said members being each formed of a single piece, with their sides of substantially equal length to bring their points of articulation diametrically opposite, the pin of at least one of the articulations being readily releasable, and the members having hinging action one upon the other when the articulation at one side of the link is disconnected.

2. In composite links, members having ends meeting and articulated to produce a complete link; one end at each point of articulation being bifurcated and the other single and fitting between the members of the bifurcation; and a pin passing through each bifurcated end and the intervening single end; one of the members of each bifurcation being diametrically grooved and the portion of the pin adjacent thereto carrying a transverse pin lying in said groove; the axes of the pins being perpendicular to and spaced apart in the plane of the link.

Signed at St. Louis, Missouri, this 31st day of March, 1927.

WILLIAM M. PRYOR.